(12) United States Patent
Cooley et al.

(10) Patent No.: US 7,923,936 B2
(45) Date of Patent: Apr. 12, 2011

(54) FLOURESCENT LAMP WITH INTEGRAL PROXIMITY SENSOR FOR BUILDING ENERGY MANAGEMENT

(75) Inventors: John J. Cooley, Cambridge, MA (US); Steven B. Leeb, Belmont, MA (US); Al-Thaddeus Avestruz, Waltham, MA (US); Leslie K. Norford, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 485 days.

(21) Appl. No.: 12/139,678

(22) Filed: Jun. 16, 2008

(65) Prior Publication Data

US 2008/0309243 A1    Dec. 18, 2008

Related U.S. Application Data

(60) Provisional application No. 60/943,908, filed on Jun. 14, 2007.

(51) Int. Cl.
*H05B 37/02* (2006.01)

(52) U.S. Cl. ........ 315/158; 315/159; 315/153; 315/155; 315/312; 315/DIG. 4

(58) Field of Classification Search .................. 315/149, 315/152–159, 291, 295, 301, 302, 307, 312, 315/DIG. 4
See application file for complete search history.

(56) References Cited

U.S. PATENT DOCUMENTS

| | | | | |
|---|---|---|---|---|
| 5,309,068 A | * | 5/1994 | Hakkarainen et al. | 315/362 |
| 5,962,989 A | * | 10/1999 | Baker | 315/294 |
| 5,971,597 A | * | 10/1999 | Baldwin et al. | 700/277 |
| 6,091,200 A | * | 7/2000 | Lenz | 315/158 |
| 6,107,755 A | * | 8/2000 | Katyl et al. | 315/307 |
| 7,224,125 B2 | * | 5/2007 | Ribarich | 315/DIG. 4 |
| 2004/0046511 A1 | * | 3/2004 | Porter | 315/291 |
| 2005/0104543 A1 | * | 5/2005 | Kazanov et al. | 315/291 |

* cited by examiner

*Primary Examiner* — Jacob Y Choi
*Assistant Examiner* — Ephrem Alemu
(74) *Attorney, Agent, or Firm* — Gauthier & Connors LLP

(57) ABSTRACT

A fluorescent lamp sensor system is provided. The fluorescent lamp sensor system includes a plurality of bulbs and a plurality of electrodes coupled to the bulbs. A balanced differential circuit measures changes in electric fields produced by the bulbs in front of the electrodes. The balanced differential circuit includes a symmetric current source associated with alternating the surface potential of the bulbs. A current mode detection circuit detects the current associated with the capacitive effects of the balanced differential circuit. A synchronous detection circuit isolates the capacitive effects of the symmetrical current source from stray signals that differ in either frequency or phase.

18 Claims, 16 Drawing Sheets

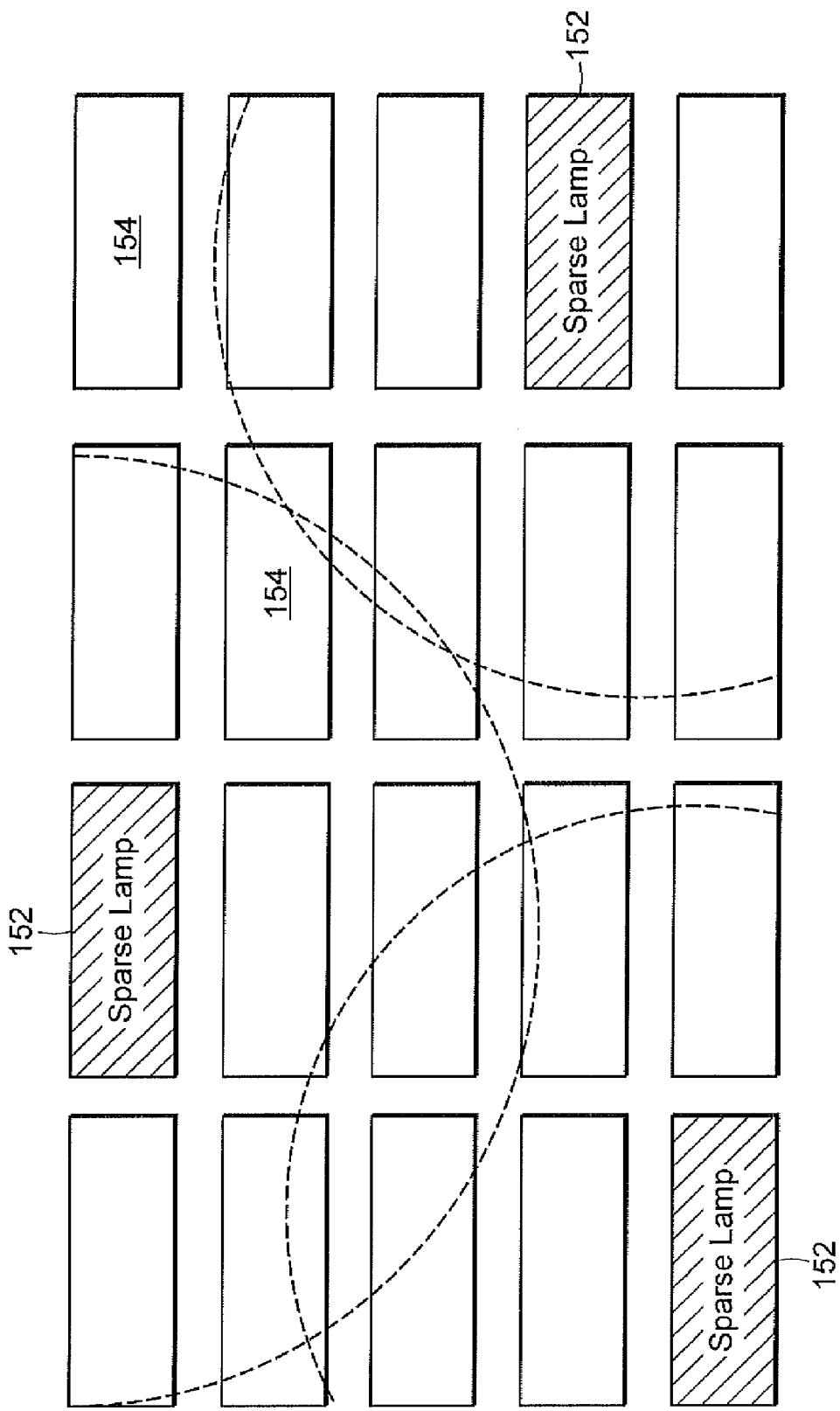

FLOURESCENT LAMP WITH INTEGRAL PROXIMITY SENSOR FOR BUILDING ENERGY MANAGEMENT

PRIORITY INFORMATION

This application claims priority from provisional application Ser. No. 60/943,908 filed Jun. 14, 2007, which is incorporated herein by reference in its entirety.

This invention was made with government support awarded by the National Science Foundation under Grant No. IIP0646585 and the Department of Justice under Grant No. DJJ-06-P-R-CIO-0234. The government has certain rights in the invention.

BACKGROUND OF THE INVENTION

The invention relates to the field of fluorescent lamps, and in particular to a fluorescent lamp with an integral proximity sensor for building energy management.

Lighting in commercial and residential spaces consumes a significant portion of the end use demand for delivered energy in the United States. In 2005, lighting consumed 0.73 Quadrillion Btu (QBtu) in the residential sector and 1.18 QBtu in the commercial sector. This accounts for 15.6% and 13.9% of the total electricity delivered in the residential and commercial sectors, respectively; approximately $20.1 billion and $29.7 billion spent by electricity consumers in the residential and commercial sectors, respectively. The invention relates to the field of fluorescent lamps, in particular a fluorescent lamp with an integral proximity sensor for building energy management.

The U.S. Environmental Protection Agency (EPA) encourages reduction of energy consumption by improving efficiency of energy systems. The EPA's Energy Star program provides energy efficient solutions for reducing energy consumption while maintaining or improving the current standards of living. The Energy Star program also recognizes businesses and organizations for reducing greenhouse gas emissions through energy efficiency. "In 2006 alone, Americans with the help of Energy Star saved $14 billion on their energy bills and avoided greenhouse gas emissions equivalent to those of 25 million vehicles.

One implementation strategy for reducing energy consumption described by the Energy Star program is to reduce lighting in unoccupied spaces using motion sensors to detect occupants. Motion sensors monitor large spaces and turn lights on and off based on occupant motion. In principle, they reduce the energy consumed by lights in unoccupied spaces. There are several disadvantages associated with detecting occupancy using motion sensors. First, the occupancy measurement is often based on motion rather than presence. To turn on the lights, occupants must periodically move in view of the sensor. Unfortunately, lights can turn off despite occupancy and stay on for some time after the occupants have left. Second, the motion detectors require custom installation distinct and in addition to the installation of luminaires. There is a premium on minimizing sensor hardware and installation expense, and measurement networks are often as coarse grain as possible to implement a basic level of functionality. Typical motion sensor implementations may allocate one motion sensor to an entire large room. If the rooms are sparsely occupied, there is still significant wasted energy on lighting unoccupied spaces. Finer grain lighting control increases sensor expense and installation effort.

The invention provides a novel technique in managing the energy expended by lighting systems.

SUMMARY OF THE INVENTION

According to one aspect of the invention, there is provided a fluorescent lamp sensor system. The fluorescent lamp sensor system includes a plurality of bulbs and a plurality of electrodes coupled to the bulbs. A balanced differential circuit measures changes in electric fields produced by the bulbs in front of the electrodes. The balanced differential circuit includes a symmetric current source associated with alternating the surface potential of the bulbs. A current mode detection circuit detects the current associated with the capacitive effects of the balanced differential circuit. A synchronous detection circuit isolates the capacitive effects of the symmetrical current source from stray signals that differ in either frequency or phase.

According to another aspect of the invention, there is provided a method of implementing a fluorescent lamp sensor system. The method includes providing a plurality of bulbs and providing a plurality of electrodes coupled to the bulbs. A balanced differential circuit is provided for measuring changes in electric fields produced by the bulbs in front of the electrodes. The balanced differential circuit includes a symmetric current source associated with alternating the surface potential of the bulbs. Also, the method includes providing a current mode detection circuit for detecting the current associated with the capacitive effects of the balanced differential circuit, and providing a synchronous detection circuit for isolating the capacitive effects of the symmetrical current source from stray signals that differ in either frequency or phase.

According to another aspect of the invention, there is provided a method of performing the operations of a fluorescent lamp sensor system. The method includes providing a plurality of bulbs and providing a plurality of electrodes coupled to the bulbs. Also, the method includes measuring changes in electric fields produced by the bulbs in front of the electrodes using a symmetric current source associated with alternating the surface potential of the bulbs. Furthermore, the method includes detecting the current associated with the capacitive effects of the balanced differential circuit, and isolating the capacitive effects of the symmetrical current source from stray signals that differ in either frequency or phase.

According to another aspect of the invention, there is provided a lighting system. The lighting system includes a plurality of fluorescent lamp structures being positioned to provide lighting in an enclosed space. A plurality of detection structures comprising a selective number of the fluorescent lamp structures to detect whether an occupant is within the enclosed space. Each of the detection structures includes a balanced differential circuit for measuring changes in electric fields produced by the occupant. The balanced differential circuit includes a symmetric current source associated with alternating the surface potential of bulbs associated with each of the detection structures. A current mode detection circuit detects the current associated with the capacitive effects of the balanced differential circuit. A synchronous detection circuit isolates the capacitive effects of the symmetrical current source from stray signals that differ in either frequency or phase. The intensity of the fluorescent lamp structures are increased from its initial point of intensity when an occupant has been detected by the detection structures.

BRIEF DESCRIPTION OF THE DRAWINGS

FIG. 14 is a schematic diagram illustrating overhead view of the sparse sensing technique with detection fields used in accordance with the invention.

DETAILED DESCRIPTION OF THE INVENTION

The invention involves a capacitive sensing circuitry that enables a fluorescent lamp fixture to serve "dual-use" as a proximity detector for occupants below the lamp. The lamp sensor measures changes in the electric fields produced by and surrounding the lamp with two electrodes on the luminaire cover. The lamp sensor could be used as an occupancy sensor in any place illuminated by fluorescent lighting. Because the sensor detects changes in dielectric configuration around the lamp, it does not require motion or a thermal signature to detect a person. Fine-grain measurements of occupancy provided by the lamp could enable improved energy efficiency by eliminating lighting of unoccupied spaces. The lamp sensor could also be used for security applications.

There is a great interest in controlling lighting to optimize energy consumption. An example includes the application of electrical photodetectors or illuminance sensors spread around work spaces to measure daylight. These sensors can be used to control dimming fluorescent lamp ballasts to adjust lighting levels. Other optimization schemes based on occupancy have also been proposed, again to conserve energy spent on illumination. Our approach can be deployed with additional sensing to adjust for background or "free" daylight illumination levels. It offers the possibility to adjust lighting based on occupancy without the need for a special occupancy sensor network, or a dependence on occupant motion. The invention can be integrated with the ballast, providing a "drop-in" capability in a luminaire for implementing occupancy based energy conservation schemes.

Figure 1A:
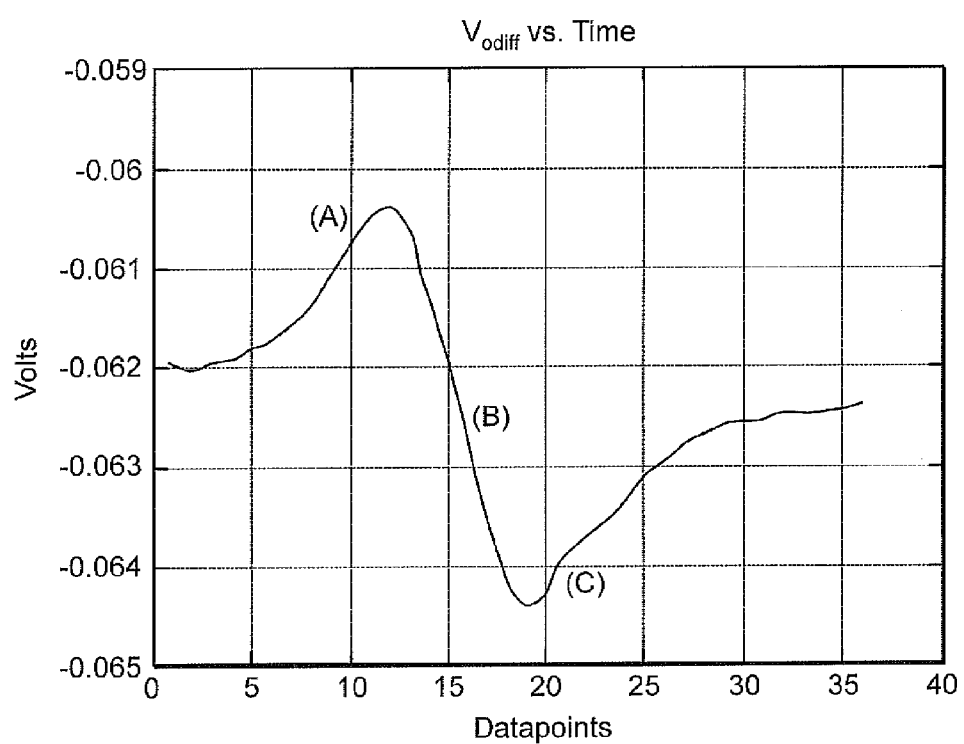
FIG. 1A is a graph illustrating the output response to a person moving under the lamp formed in accordance with the invention.

FIG. 1 shows the output of a prototype lamp sensor used in accordance with the invention. The prototype includes a two-bulb, 48-inch fluorescent fixture, the lamp sensor electronics, and two electrodes in front of the lamp. In the prototype lamp sensor, rectangular metallic electrodes are placed in front of the lamp. In a production lamp sensor, the electrodes could be sprayed onto the inside of the lamp cover with Indium Tin-Oxide. The lamp sensor ballast would require two extra wires to connect to the electrodes on the cover. An example of the lamp sensor output is shown in FIG. 1A. The two electrodes have a differential effect on the sensor output. The output voltage from the lamp sensor deviates from zero as the occupant approaches one electrode, as shown in region A. It returns to zero as the occupant approaches the center of the lamp, as shown in region B. Finally, the output voltage deviates in the opposite direction as the occupant approaches the opposite electrode, as shown in region C.

Figure 1B:
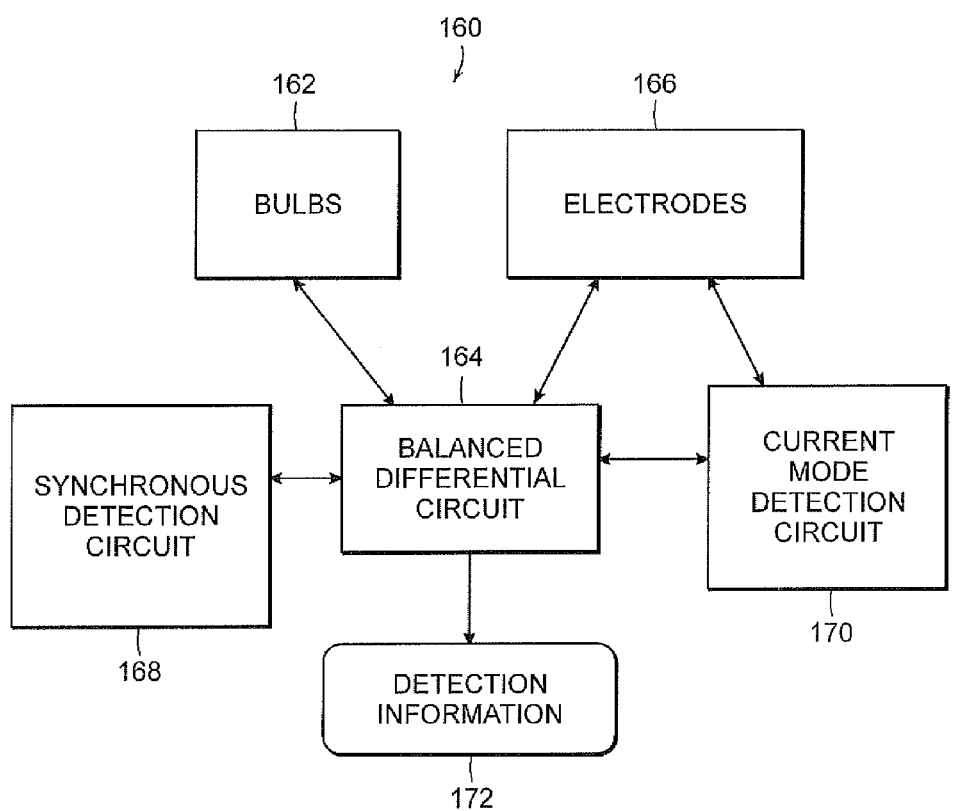
FIG. 1B is a block diagram illustrating the overall operation of the invention.

The proximity sensor design and associated signal conditioning circuitry have three key subsystems that provide the following features: balanced differential measurement circuit 164, current-mode detection 170, and synchronous detection 168, as shown in FIG. 1B. In particular, FIG. 1B is a block diagram illustrating the inventive fluorescent lamp sensor system 160. The fluorescent lamp sensor system 160 includes a plurality of bulbs 162 and a plurality of electrodes 166 coupled to the bulbs. A balanced differential circuit 164 measures changes in electric fields produced by the bulbs in front of the electrodes. The balanced differential circuit 164 includes a symmetric current source associated with alternating the surface potential of the bulbs. A current mode detection circuit 170 detects the current associated with the capacitive effects of the balanced differential circuit 164. A synchronous detection circuit 168 isolates the capacitive effects of the symmetrical current source from stray signals that differ in either frequency or phase. The balanced differential circuit 164 provides an output signal 172 indicating measurement of change in the electric field produced by the bulbs 162.

Electric fields in front of the luminaire cover are measured through a bridge or the balanced differential measurement circuit. This approach offers several advantages. First, the differential measurement does not require a well-controlled reference potential for the signal source. This is important because the signal source is the alternating bulb surface potential, which does not have a well-controlled reference. Second, the differential measurement rejects common-mode interference from stray signals at the measurement electrodes. Rejection of common-mode stray signals improves the detection specificity, for example, the response to people, in the presence of electromagnetic interference from other electronics in the environment. Third, in the absence of detection, the differential output is zero or nulled. Therefore, the differential front-end amplifier can provide very high gain without saturating the output in the absence of detection.

Figure 2:
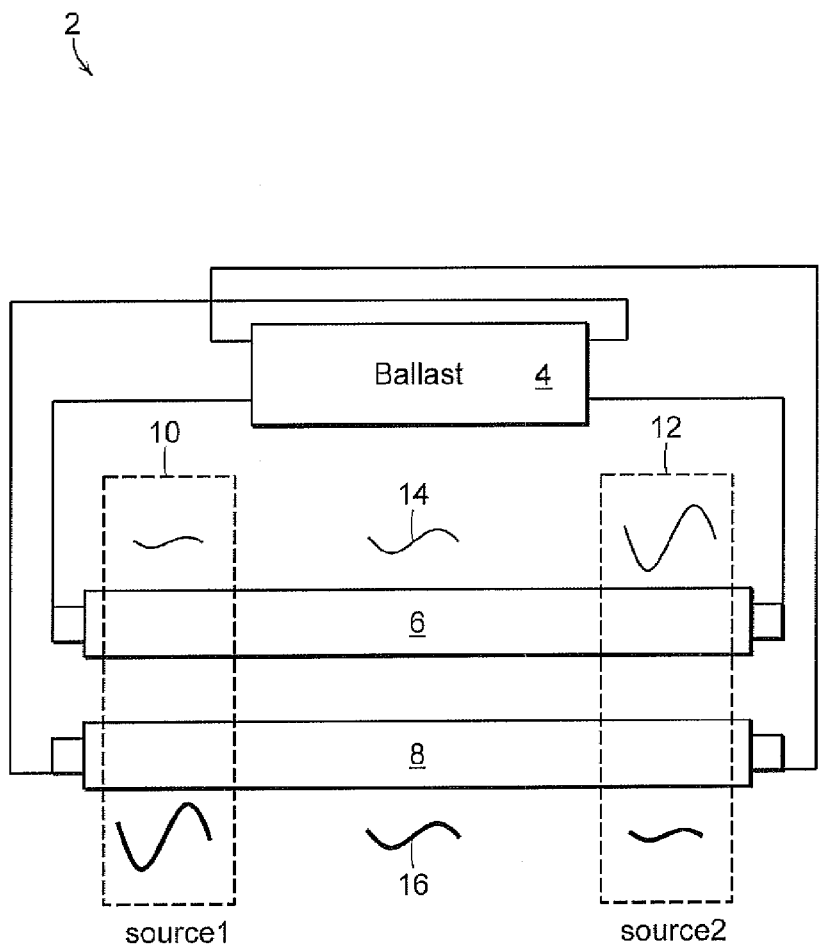
FIG. 2 is a schematic diagram illustrating reversing ballasting directions of one bulb used in accordance with the invention.

The balanced differential measurement requires a symmetrical signal source. A signal source is created which is symmetrical about the physical center of the lamp 2 by reversing the ballast 4 connections to one of two bulbs 6, 8 as shown in FIG. 2. The effective strength of the alternating voltage source 14, 16 in the context of the differential measurement between two electrodes 10, 12 is complicated because it depends on the electrode configuration, distance between the electrodes 10, 12 and the lamp 2 and distance between the two electrodes 10, 12, the asymmetric voltage profile of each bulb 6, 8, and on the geometry of the lamp 2. Because only the absolute strength of the effective voltage source is necessary for predicting absolute responses, it is not generally measured directly, although it can be inferred for each electrode configuration by comparing simulated responses to measured responses.

Figure 3:
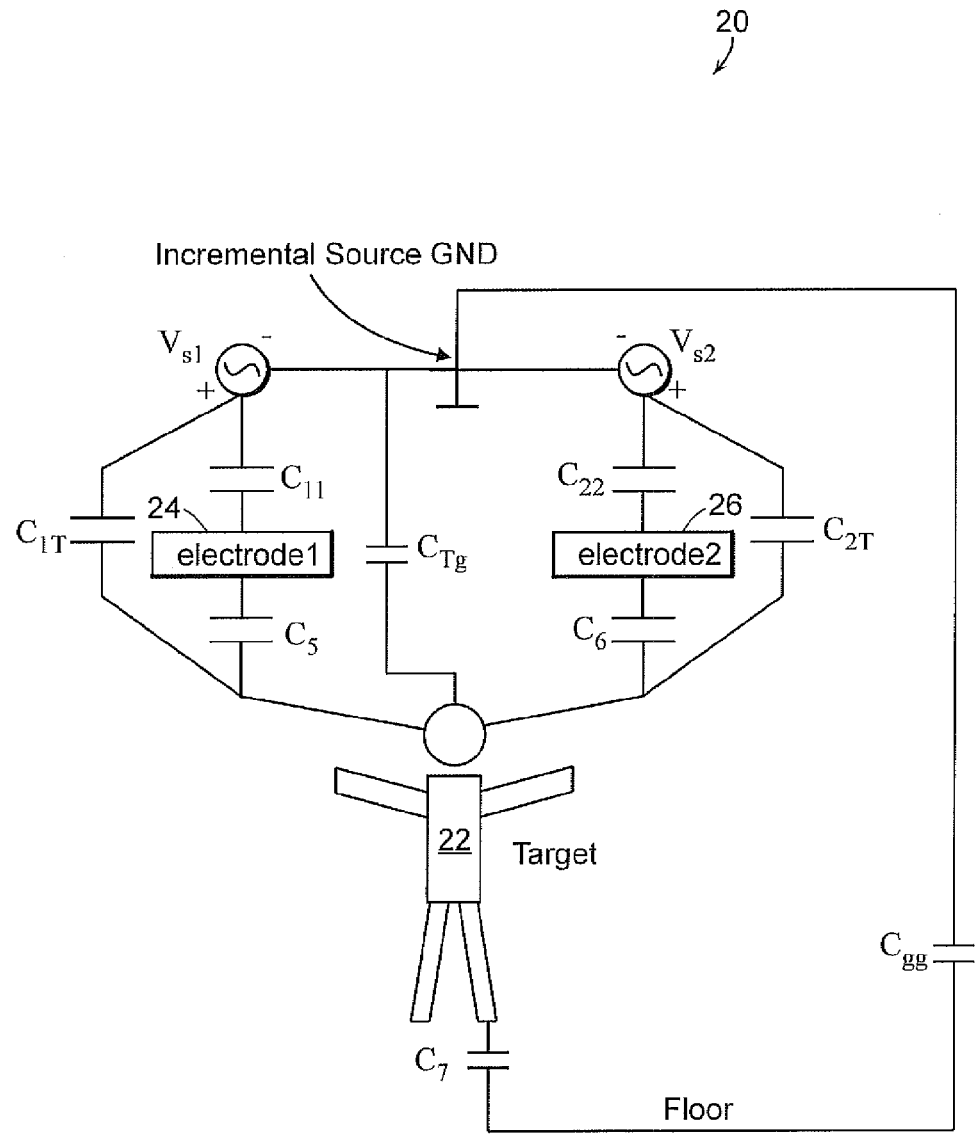
FIG. 3 is a schematic diagram illustrating the lumped element capacitive model of capacitances of interest between conducting surfaces and the lumped signal sources in the inventive lamp sensor and target system.

Measuring electric field changes below the lamp in response to a conducting or dielectric target amounts is needed to measure changes in lumped capacitance values between conducting surfaces. The simplified physical capacitive model 20 of the lamp sensor 2 and target 22, for example a person, is shown in FIG. 3. The physical model 20 includes the capacitances ($C_{1T}$, $C_{2T}$, $C_{11}$, $C_{22}$, $C_{Tg}$, $C_{gg}$, C5, C6, and C7) of interest between conducting surfaces (electrode1, electrode2) including the lumped signal source $V_{s1}$, $V_{s2}$ and the human target 22. For simulation, capacitance values are readily obtained using software like the multipole-expansion finite-element modeling software FastCap.

The "incremental source ground" labeled in FIG. 3 represents the lumped portion of the lamp structure to which currents leaving the lumped effective voltage sources ultimately return. Electrically it represents the potential to which both effective voltage sources are referenced such that they are equal to each other in magnitude.

Figure 4:
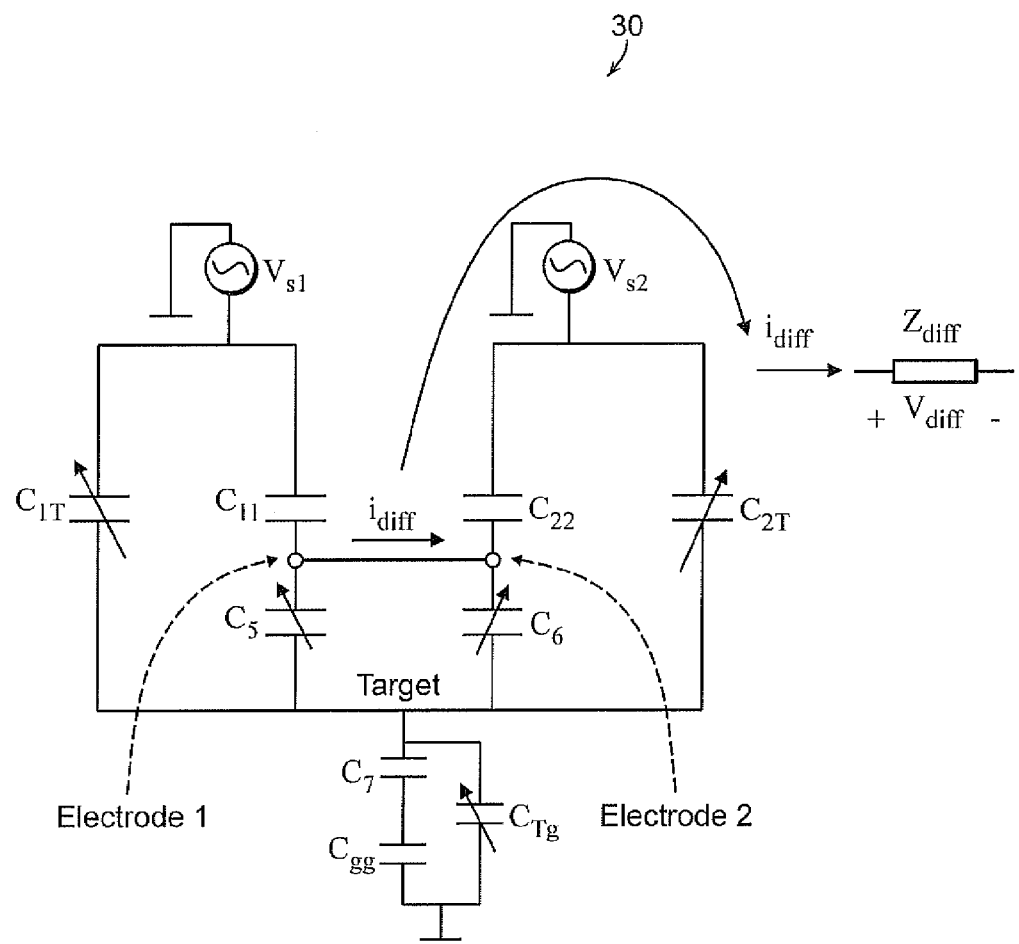
FIG. 4 is a schematic diagram illustrating the lumped element capacitive circuit having the capacitances of interest used in accordance with the invention.

Capacitances that vary depending on the position of the human target below the lamp have a range of capacitances that is lower bounded by the minimum detectable change in capacitance in the system presented here. The capacitive model 20 is redrawn as the capacitive circuit 30 in FIG. 4. The measured signal is the differential current labeled $i_{diff}$ which is the current that passes through the effectively low-impedance path from electrode1 to electrode2 created by the differential transimpedance amplifier 40 shown in FIG. 5.

Figure 5:
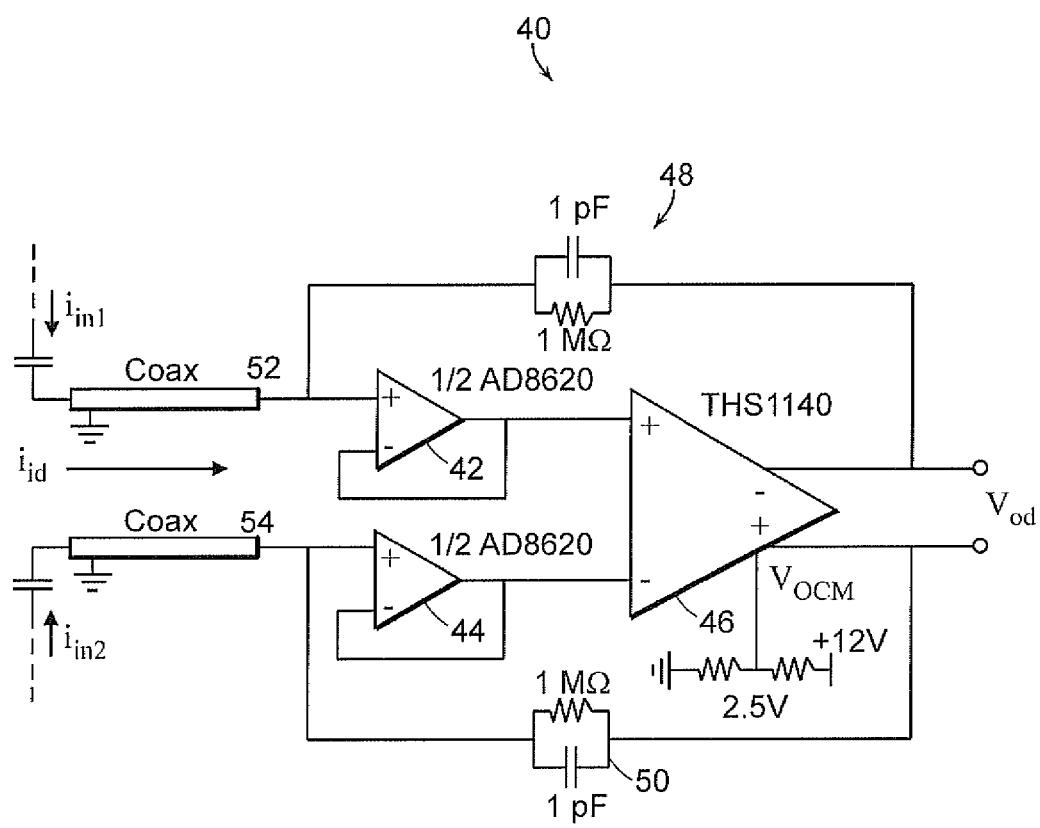
FIG. 5 is a schematic diagram illustrating the low-noise analog front-end amplifier used in accordance with the invention.

This capacitive circuit 30 is connected through shielded electrodes 52, 54 to an analog front-end amplifier 40. The electrodes 52, 54 are connected directly to the high-impedance inputs of a high-gain op-amp in closed-loop feedback. This transimpedance amplifier 40 detects changes in current in the capacitive circuit 30 of FIG. 4. The schematic of the transimpedance front-end amplifier 40 is shown in FIG. 5. The JFET op-amps 42, 44 buffer the inputs of the fully-differential op-amp 46 for low input-offset current and low input-referred current noise. Feedback capacitors 48, 50 stabilize the system using lead compensation in order to provide a stable closed-loop response despite the capacitive input elements.

One advantage of using current-mode detection, by connecting the electrodes directly to the inputs of the front-end op-amp 40, is that stray capacitances from the electrodes to incremental ground can be neglected in the output response of the front-end amplifier $V_{od}$. The fully-differential circuit includes the signal source $V_{s1}$, $V_{s2}$ and front-end amplifier 40 can be separated into two identical half-circuits. The voltage reference for each half-circuit is the voltage about which the two halves of the differential voltages in the fully differential circuit are symmetric.

Figure 6A:
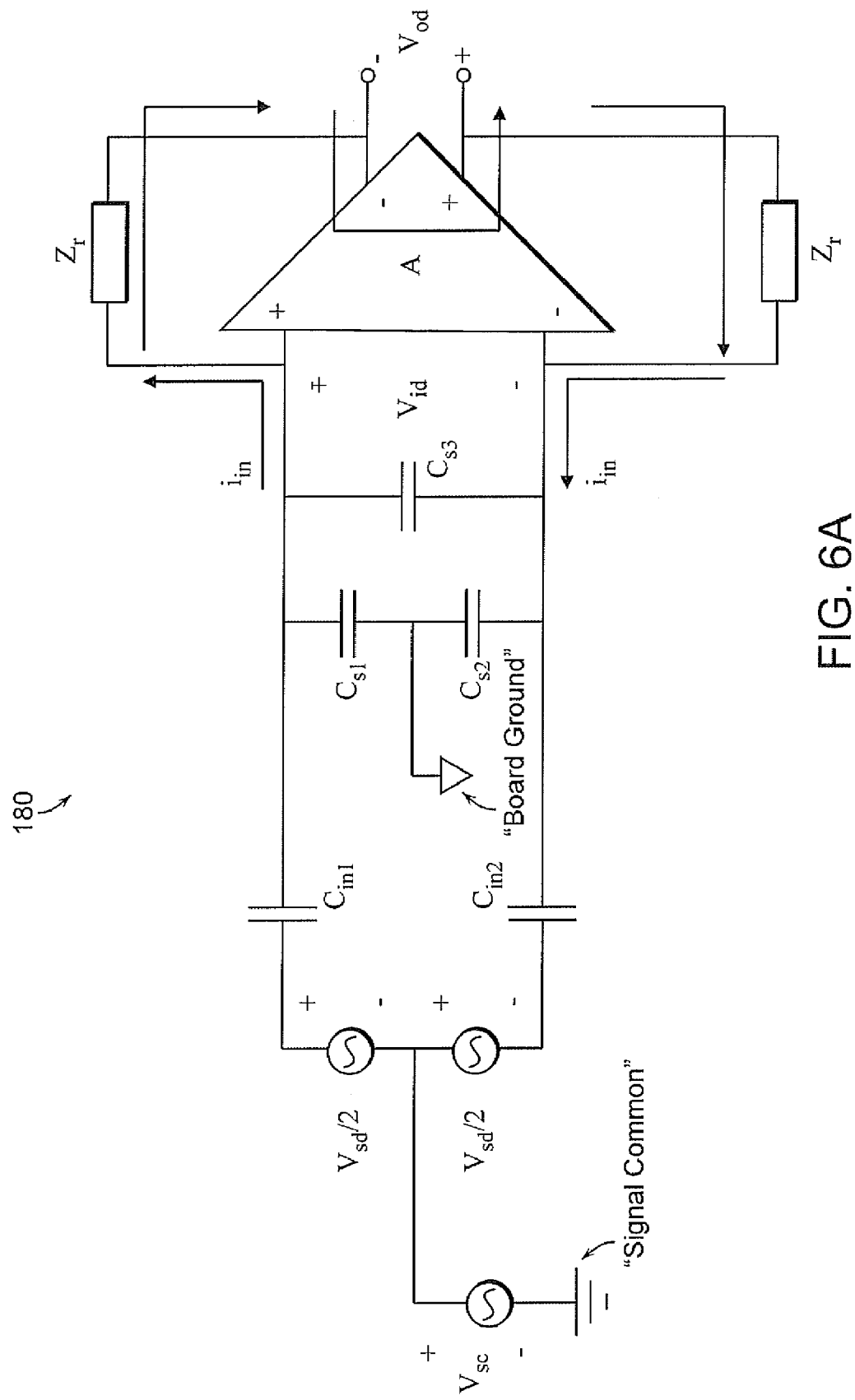
FIGS. 6A-6B are circuit diagrams illustrating a fully-differential transimpedance amplifier (FD Z-amp) with stray capacitances.

FIG. 6A is a circuit diagram 180 illustrating a fully-differential transimpedance amplifier (FD Z-amp) with stray capacitances. In FIG. 6A, "board ground" is the power supply ground reference for the signal conditioning electronics. The signal source is drawn as a generalized decomposition into differential ($V_{sd}$) and common-mode ($V_{sc}$) parts referenced to the "signal common." Generalized input capacitances, $C_{in1}$ and $C_{in2}$ couple the signal source to the input nodes (+ and −) of the FD Z-amp. Stray capacitances $C_{s1}$ and $C_{s2}$ couple the FD Z-amp input nodes to board ground and stray capacitance $C_{s3}$ couples one input node directly to the other. In the lamp sensor system, the input nodes to the FD Z-amp are connected directly to the two measurement electrodes with coaxial shielded cables. The shield capacitances in these cables are one important example of capacitances represented by $C_{s1}$ and $C_{s2}$.

The FD Z-amp is insensitive to the three stray capacitances in FIG. 6A by virtue of the current-mode detection inherent to the amplifier. Generally speaking, current-mode detection implies an amplifier whose input impedance is effectively very small, approaching that of a short-circuit as opposed to voltage-mode detection which implies an amplifier whose input impedance is effectively very large, approaching that of an open-circuit. For now, one can assume that the FD Z-amp presents an "ideal short-circuit" between its input nodes or a zero input impedance. After the conceptual developments, one can quantify this assumption and thereby solidify the relevance of the concepts.

The effect of the FD Z-amp on the stray capacitance $C_{s3}$ that couples one input node directly to the other is more easily understood than the effect of the FD Z-amp on $C_{s1}$ and $C_{s2}$. Because $C_{s3}$ spans the inputs to the FD Z-amp, it is simply short-circuited by the effective low input impedance of the amplifier. That is, currents that choose between the impedance presented by $C_{s3}$ and the impedance presented by the amplifier, prefer the amplifier pathway. Therefore, no current is shunted away from the amplifier by $C_{s3}$ and the amplifier is said to be insensitive it.

Figure 6B:
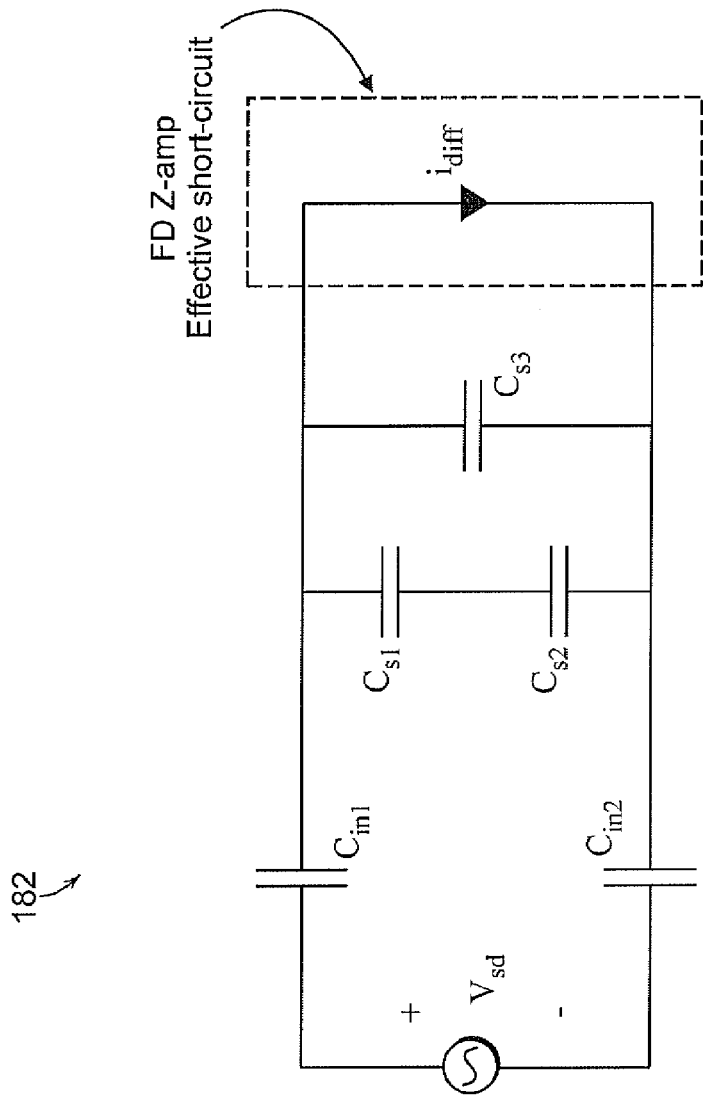

In the lamp sensor system, the "signal common" represents the common or ground reference for the lamp ballast. It is not generally coupled to the "board ground" through a low-impedance path. Assuming infinite impedance between the board ground and the signal common, there exists no return path through the board ground for currents originating at the signal source. The only current return paths available for currents originating at the signal source are through the series combination of $C_{s1}$ and $C_{s2}$, through $C_{s3}$ and through the effective low-impedance path presented by the FD Z-amp input. This notion is represented by the simplified circuit drawn in FIG. 6B. Upon examination of the circuit 182 in FIG. 6B, it is clear that $C_{s1}$ and $C_{s2}$ are short-circuited by the effect of the FD Z-amp. It is also still clear from FIG. 6b that stray capacitance Cs3 is short-circuited as well. Again, currents that choose between the non-zero impedance path through the series combination of $C_{s1}$ and Cs2, through $C_{s3}$, or through the short-circuit presented by the amplifier will choose the path through the amplifier. Therefore, none of these stray capacitances shunt current away from the inputs to the FD Z-amp and the amplifier is said to be insensitive to them.

The actual impedance of the short-circuit presented at the input to the FD Z-amp can be calculated with an understanding that the FD Z-amp provides a current return path via its differential output structure. Referring again to FIG. 6A, the current path through the amplifier is marked with lines and arrows and the current into the amplifier is labeled "$i_{in}$." The differential input voltage to the FD Z-amp is labeled $V_{id}$ and the differential output voltage, $V_{od}$. The amplifier action constrains $V_{od}$ to be its differential gain, A, times $V_{id}$:

$$V_{od} = A*V_{id} \quad \text{Eq. 1}$$

where A is the differential gain. The input impedance to the amplifier (the impedance of the short-circuit) can be calculated by writing an expression from Kirchoff's Voltage Law (KVL) for that current path s the following:

$$-i_{in}*Z_f + V_{od} - i_{in}*Z_f + V_{id} = 0 \quad \text{Eq. 2}$$

Rewriting Eq. 2 with $V_{od} = A*V_{id}$ produces the following relationship:

$$V_{id}*(1+A) = 2*i_{in}*Z_f \quad \text{Eq. 3}$$

So that the input impedance is $$Z_{in} = V_{id}/i_{in} = 2*Z_f/(1+A). \quad \text{Eq. 4}$$

Therefore, the impedance of the short-circuit is twice the impedance of the feedback impedance, $Z_f$, reduced by a factor of $(1+A)$. A is large by design for a practical fully-differential op-amp, so this effective impedance is relatively small. Quantitatively, the amplifier is insensitive to the stray capacitances in FIG. 6A as long as the impedance $2*Z_f/(1+A)$ is small compared to the impedances presented by the stray capacitances. For example, if $Z_f$ and A are generally frequency dependent $|Z_f(j*\omega)/A(j*\omega)|$ must be much less than $1/|j*\omega*C_{s1}|$ for the amplifier to be insensitive to $C_{s1}$.

Typical numbers in our lamp sensor system are $\omega=2\pi*42$ kHz; $|Z_f(j*\omega)|=1$ MΩ; $|A(j*\omega)|=2200$; $C_{s1}=50$ pF (shield capacitance). These numbers yield $|Z_f(j*\text{omega})/A(j*\omega)|=454$ Ω and $1/|j*\omega*C_{s1}|=76$ kΩ. Even for large feedback impedance values and an admittedly conservative amplifier gain, relatively large stray capacitances present impedances 2 orders of magnitude greater than the impedance presented by the amplifier. Therefore, one can expect the current-mode detection scheme to be insensitive to reasonable stray capacitances in the system.

Figure 7:
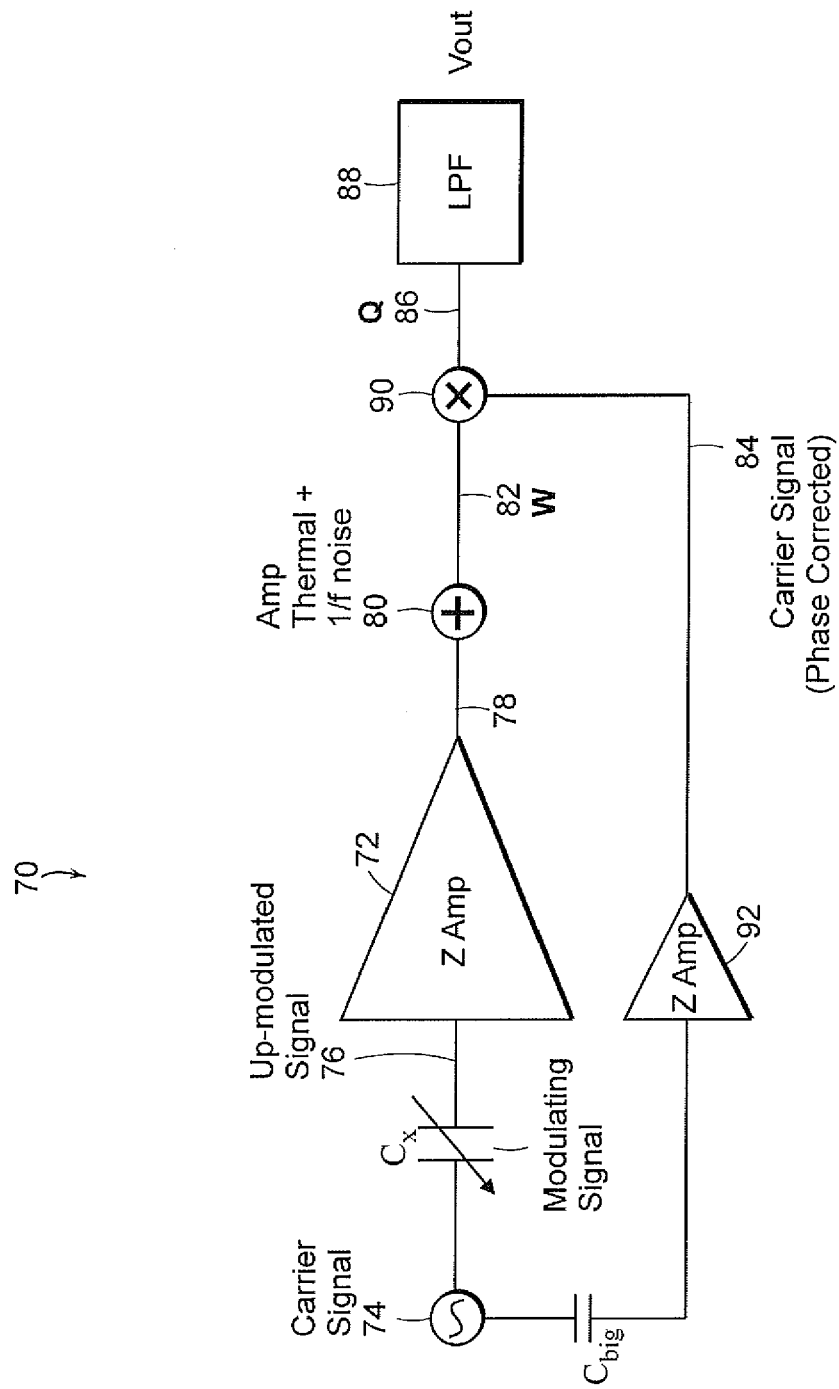
FIG. 7 is a simplified block diagram of the synchronous detection system detects changes in the effective input capacitance.

The signal conditioning circuitry uses synchronous detection to isolate the effect of the symmetric alternating signal source on the capacitive system from other stray signals that differ either in frequency or in phase. In the synchronous detection scheme, the carrier signal is the alternating voltage source signal from the bulbs. The baseband signal results from the changes in the effective input capacitance due to the presence or movement of the target below the lamp. The carrier signal frequency is the ballast frequency. For the prototype lamp sensor, the ballast frequency is 42 kHz although many operating frequencies are possible. A simplified block diagram of the synchronous detection system 70 is shown in FIG. 7. An up-modulated carrier signal results from the carrier signal 74 driving current through the changing effective input capacitance Cx. The amplifier 72 amplifies the up-modulated signal 76 and produced an amplified output signal 78. Noise associated with the amplifier 72, thermal noise, and 1/f noise are added to the amplified output signal 78 using an adder 80 to correctly reflect noise gained by the amplified output signal 78 after amplification. The adder 80 produces an output signal 82, which is down-modulated back to the baseband. This is accomplished by multiplication with a phase corrected carrier signal 84 using a multiplier 90 that produces an output signal 86. The phase corrected carrier signal 84 was created by using a copy of the carrier signal 74 and correcting its phase using the capacitor $C_{big}$ and amplifying the signal using the amplifier 92. The low pass filter 88 performs low pass filtering on the output signal 86 and produces the output signal $V_{out}$.

Figure 8:
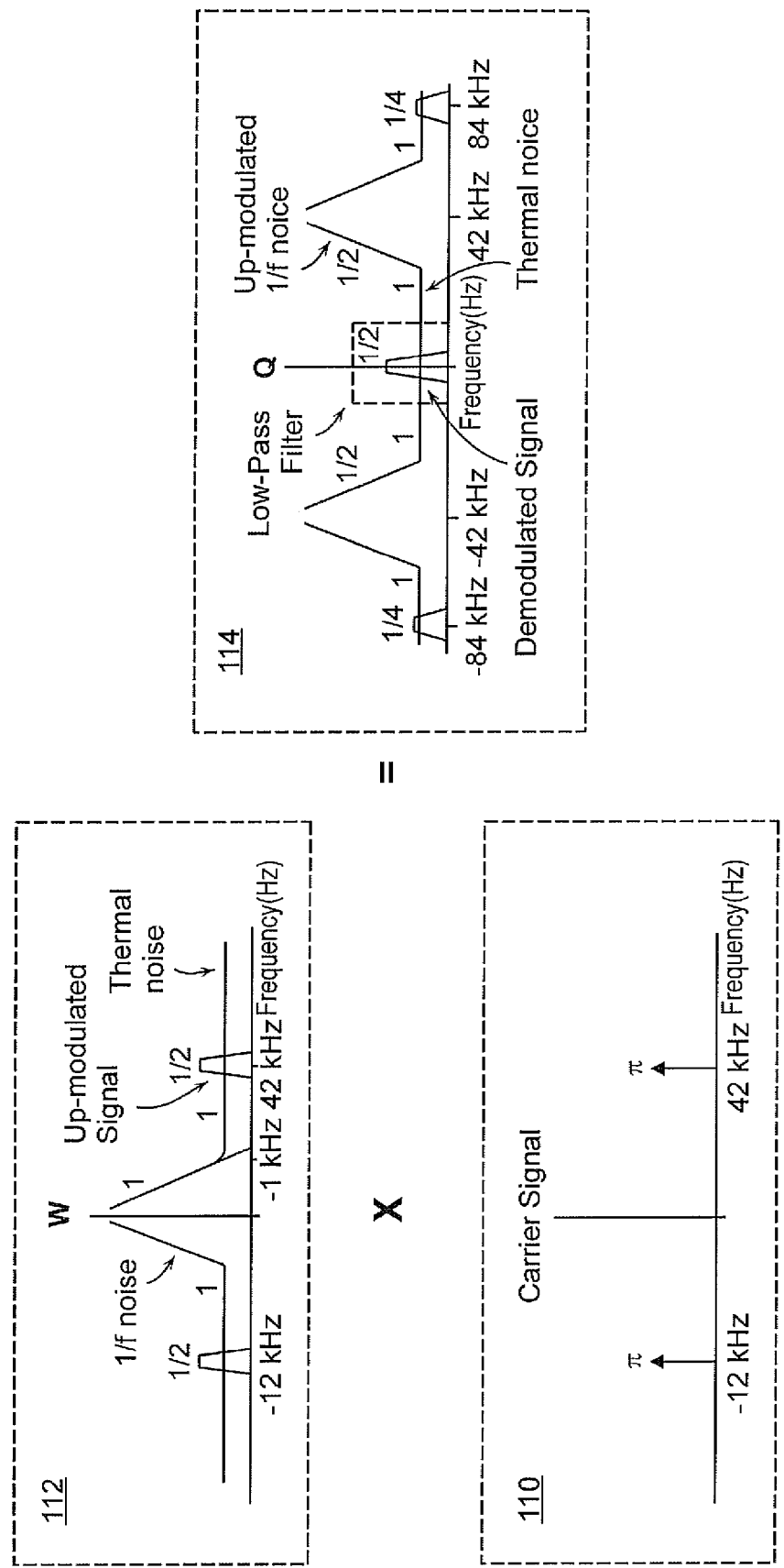
FIG. 8 is a schematic diagram illustrating the frequency domain of the demodulation of the amplified up-modulated signal by multiplication with the carrier.

Stray signals in the detection environment include alternating signal sources created by other fluorescent lamps, and other uncontrolled signal sources in the lamp and fixtures. An illustrative example considers the effect of low-frequency 1/f noise from the front-end op-amp 40 as an unwanted signal on the output in the synchronous detection system. FIG. 8 outlines the frequency domain treatments 110, 112 of the carrier and baseband signals in the presence of the stray signal which in this case is 1/f noise from the op-amp in the front-end amplifier.

Because the amplification of the up-modulated signal takes place in the high frequency regime, the low-frequency or stray 1/f noise is left out of the final demodulated signal after low-pass filtering, as shown in the frequency domain treatment 114. Stray signals at the input of the lamp sensor are also treated like the 1/f noise from the amplifier; this example illustrates the specific advantage of using synchronous detection in the context of rejecting low-frequency noise from the electronics that would otherwise be overwhelming. This principle is similar to chopper-stabilization of amplifiers for low-frequency signal amplification.

Figure 9:
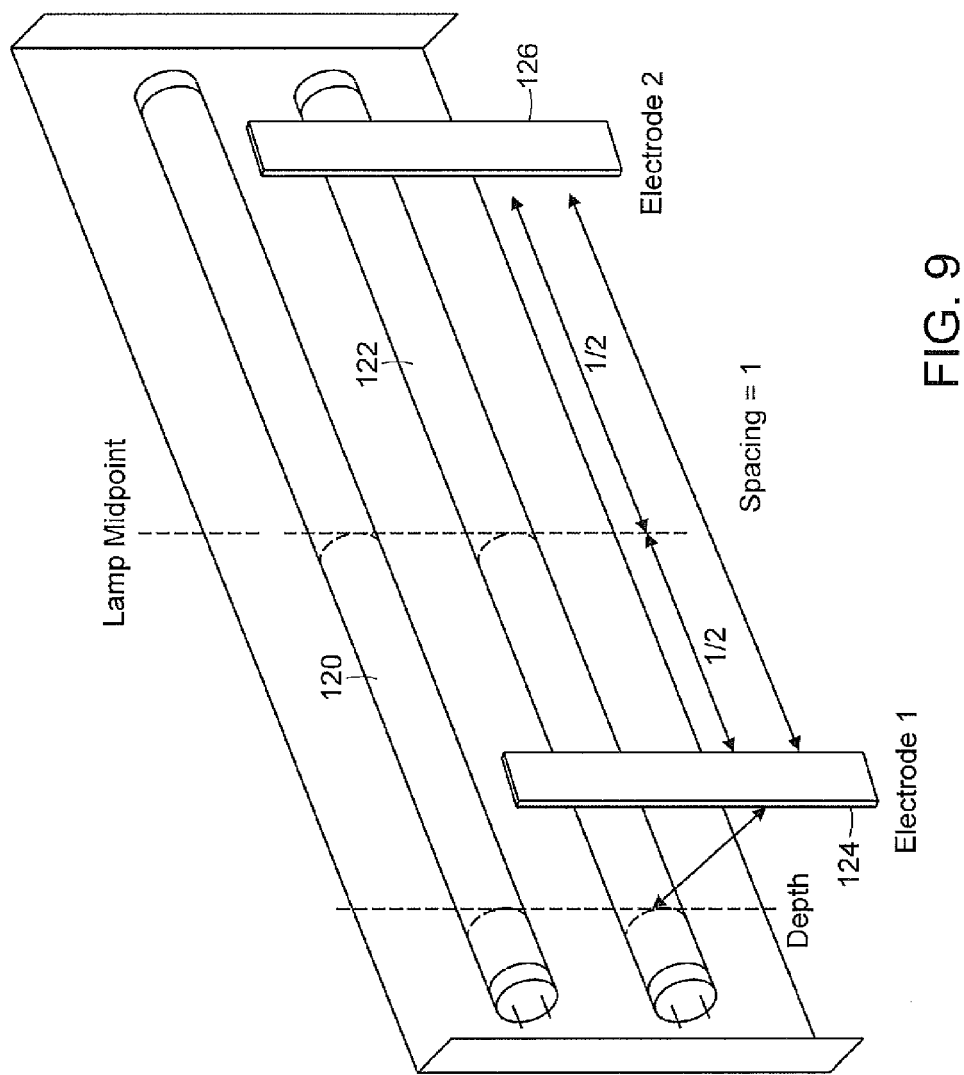
FIG. 9 is a schematic diagram illustrating the two-bulb fluorescent lamp and electrodes used in accordance with the invention.

From the perspective of a lighting designer, three key parameters affect the output sensitivity, e.g., detection range, of the proximity detector: electrode spacing, electrode depth, and bulb power. FIG. 9 is a schematic diagram illustrating varying the depth and spacing of the electrodes 124, 126 and the bulbs 120, 122. The output sensitivity is equal to the signal to noise ratio (SNR) at the output. The output response of the lamp sensor is compared to the noise floor in a detection range test. The detection data show that the noise floor does not vary dramatically with the electrode configuration. Therefore, one can simply view the magnitude of the output response as the output sensitivity when varying the electrode configuration.

Figure 10:
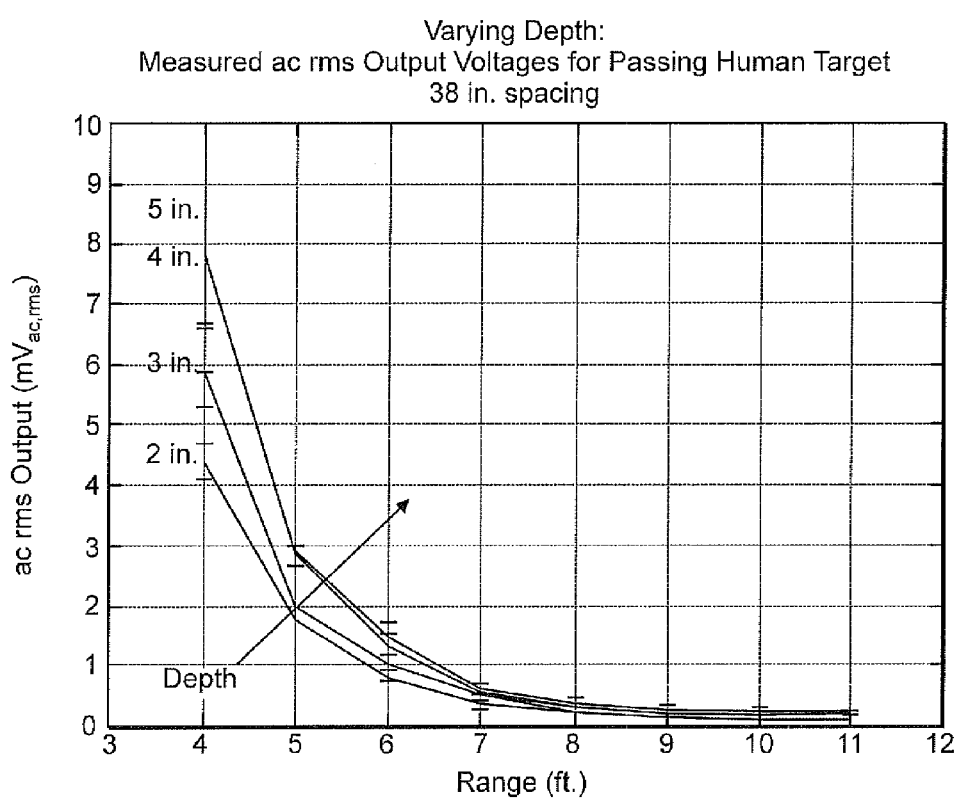
FIG. 10 is a graph illustrating the measured ac rms output response to a person walking below the lamp for varying electrode depths.

Output data taken from the lamp sensor prototype for varying electrode depths is shown in FIG. 10. The output voltage data is plotted as ac rms voltage for a passing target for ease of comparison with the noise floor of the lamp sensor. The output response increases for all ranges as the electrode depth increases. Therefore, one way to increase sensitivity and detection range is to increase electrode depth.

Because the electrodes might be sprayed onto the inside of the lamp cover, the cover needs to accommodate the electrode depth. Deeper lamp covers are useful for longer detection ranges. Longer detection ranges are only necessary when the lamp is farther from the occupant. The farther the lamp is from the occupant, the less aesthetic impact will be caused by deeper covers.

Figure 11:
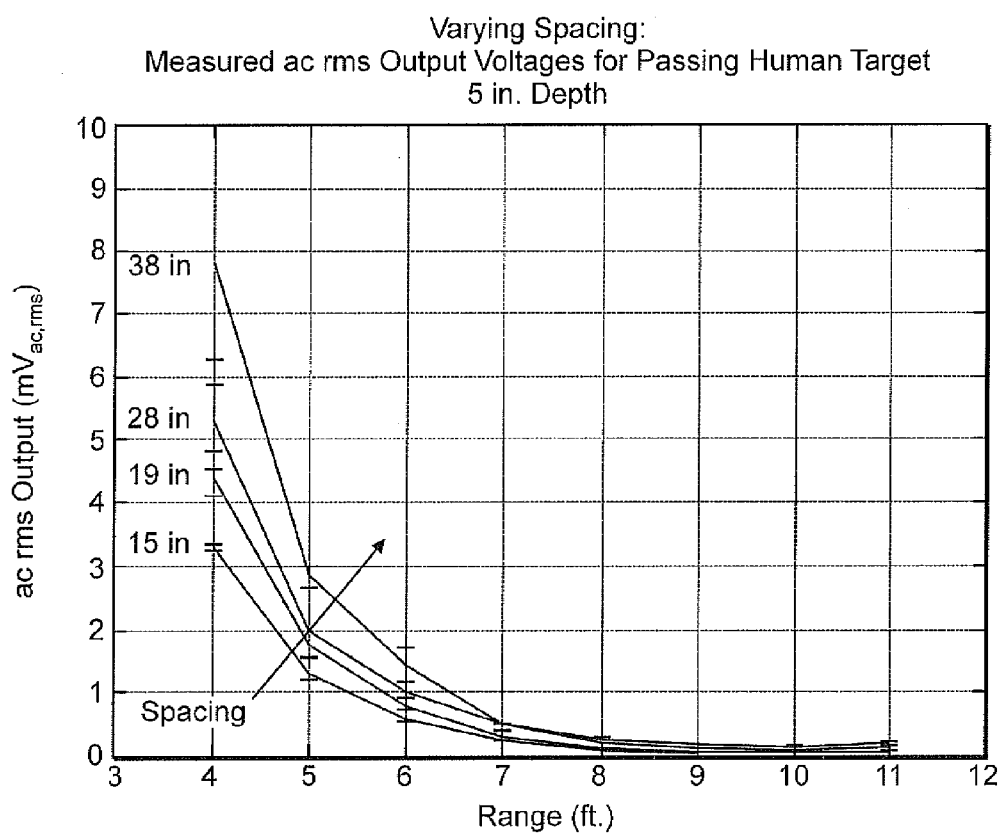
FIG. 11 is a graph the measured ac rms output response to a person walking below the lamp for varying electrode spacings.

Output data taken from the lamp sensor prototype for varying electrode spacing is shown in FIG. 11. As the spacing between the electrodes increases, so does the difference measurement of the electric field between the two electrodes. Therefore, the output response increases as the electrode spacing increases.

The lamp sensor does not work if the lamps have no voltage across them. Therefore, two sensing schemes are presented that reduce wasted lighting energy but retain lamp sensor detection capabilities: one in which every lamp is dimmed (dimmed sensing) and one in which most lamps are turned off but some are left on for detection (sparse sensing).

The dimmed sensing scheme for occupancy detection uses a dimming fluorescent lamp ballast in concert with the proximity sensing electronics in each lamp. It is possible to use the proximity sensor with the lamps completely dark, but with an applied voltage below the striking voltage of the lamp. If an occupant is detected below any lamp, that lamp brightens. FIG. 14 shows an overhead view of the dimmed sensing scheme.

In this approach, all of the lamps are left on or appear off, but they may be dimmed. When an occupant is detected below a lamp, the lamp increases its intensity to full brightness, or, alternatively, to a level appropriate based on time of day, lighting scene selection from a wall control, or background lighting (window light), as appropriate. The ballast can include other detectors, i.e., for photosensors for window or background lighting, to implement more sophisticated control schemes, as desired. That is, common lighting intensity and timing control schemes can, of course, be "mixed and matched" with the proximity sensor. For detecting an occupant below the lamp, the lamp sensor needs only to reliably detect the upper portion (e.g., the head) of an occupant. Therefore, the minimum useable detection range is determined by the distance between the lamp sensor and the top of the shortest occupant that one wants to detect. The output sensitivity may change with the bulb power. Therefore, when designing a dimmed sensing occupancy detection system, the output sensitivity under dimmed conditions must be sufficient for the desired detection range.

This dimmed sensing technique offers several advantages. First, by dimming the lamps rather than turning them off, the bulbs may last longer by avoiding unnecessary restarts. Second, dimming all of the lights results in uniform lighting of unoccupied spaces. If one wants to leave unoccupied spaces partially lit, uniform lighting of those spaces may be preferable.

Figure 12:
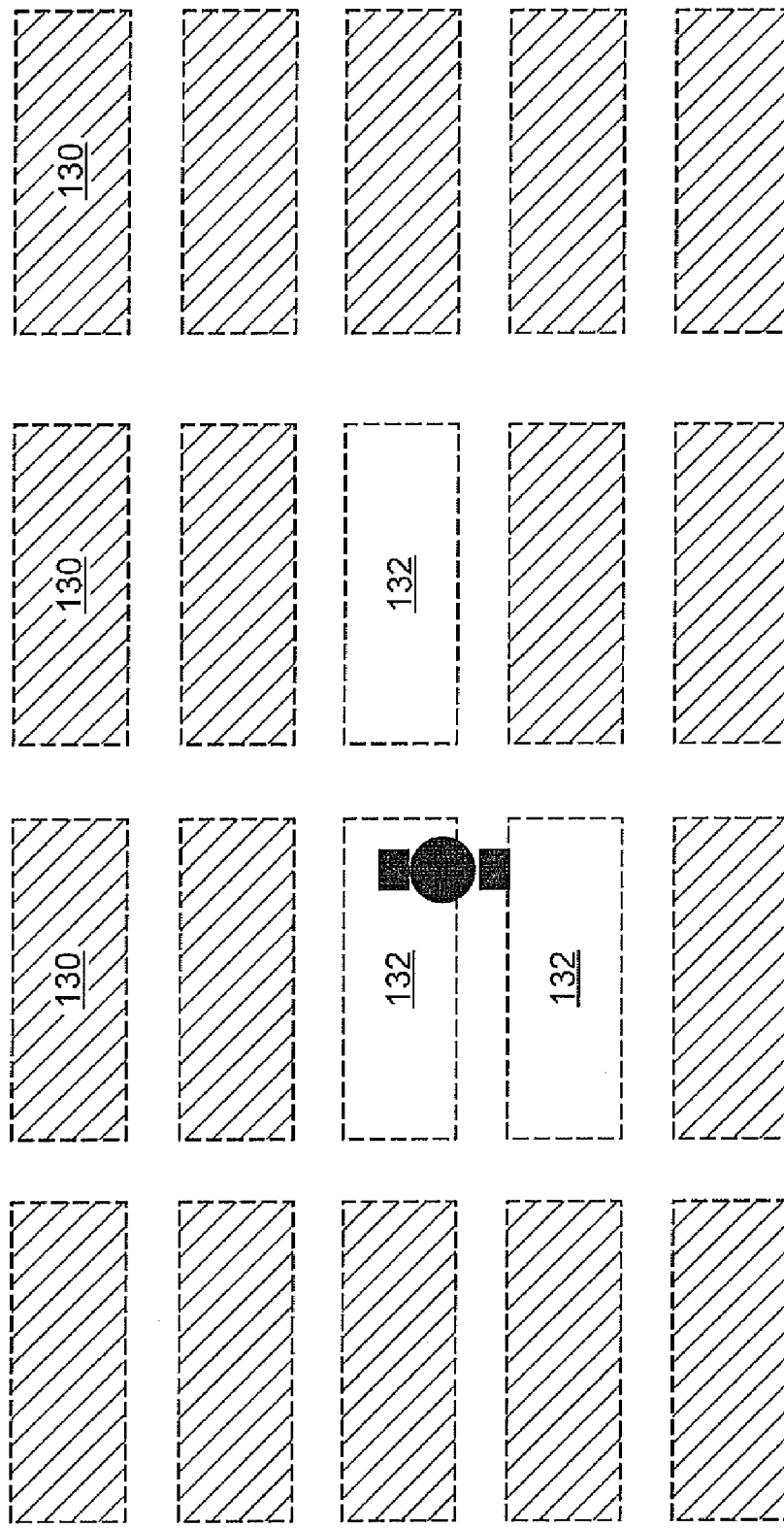
FIG. 12 is a schematic diagram illustrating an overhead view of the dimmed sensing technique used in accordance with the invention.

FIG. 12 shows an overhead view of the dimmed sensing scheme: all of the lights are left on but dimmed. When a lamp sensor detects an occupant, it turns full-on. Shaded boxes 130 represent dimmed lamps and unshaded boxes 132 represent full-on lamps.

Rather than requiring the lamps to be on but dimmed, it is possible to sense with the lamps "on" but unstruck. Under unstruck conditions the current through each bulb is very low and the voltage across each bulb can be very high. Sensing can be possible by driving the bulbs with large alternating voltages, but without striking them. This would allow for potentially increased power savings over the dimmed sensing scheme and good sensitivity. One drawback to this technique over the dimmed sensing scheme is that bulb life can be reduced due to frequent striking and extinguishing of the bulbs.

Alternatively, the sparse sensing scheme leaves one or a few lamps on in a cluster of many lamps that are turned completely off. Only those lamps that are left on ("sparse lamps") act as lamp sensors. The distance between sparse lamps is constrained by the detection range of the lamp sensor under full power. The lamp sensor detection field below the lamp is not necessarily directional, although the electrode configurations can be designed to make it so. Therefore, the detection field also generally includes space to the side of the vertical space below the lamp. In order to have no "blind spots" in the sparse lamp sensor array, the sparse lamps should be able to reliably detect the top surface of the shortest occupant. The detection field for each sparse lamp would typically, but not necessarily be designed to include the space below the lamp and the space under the adjoining turned-off lamps.

Figure 13:
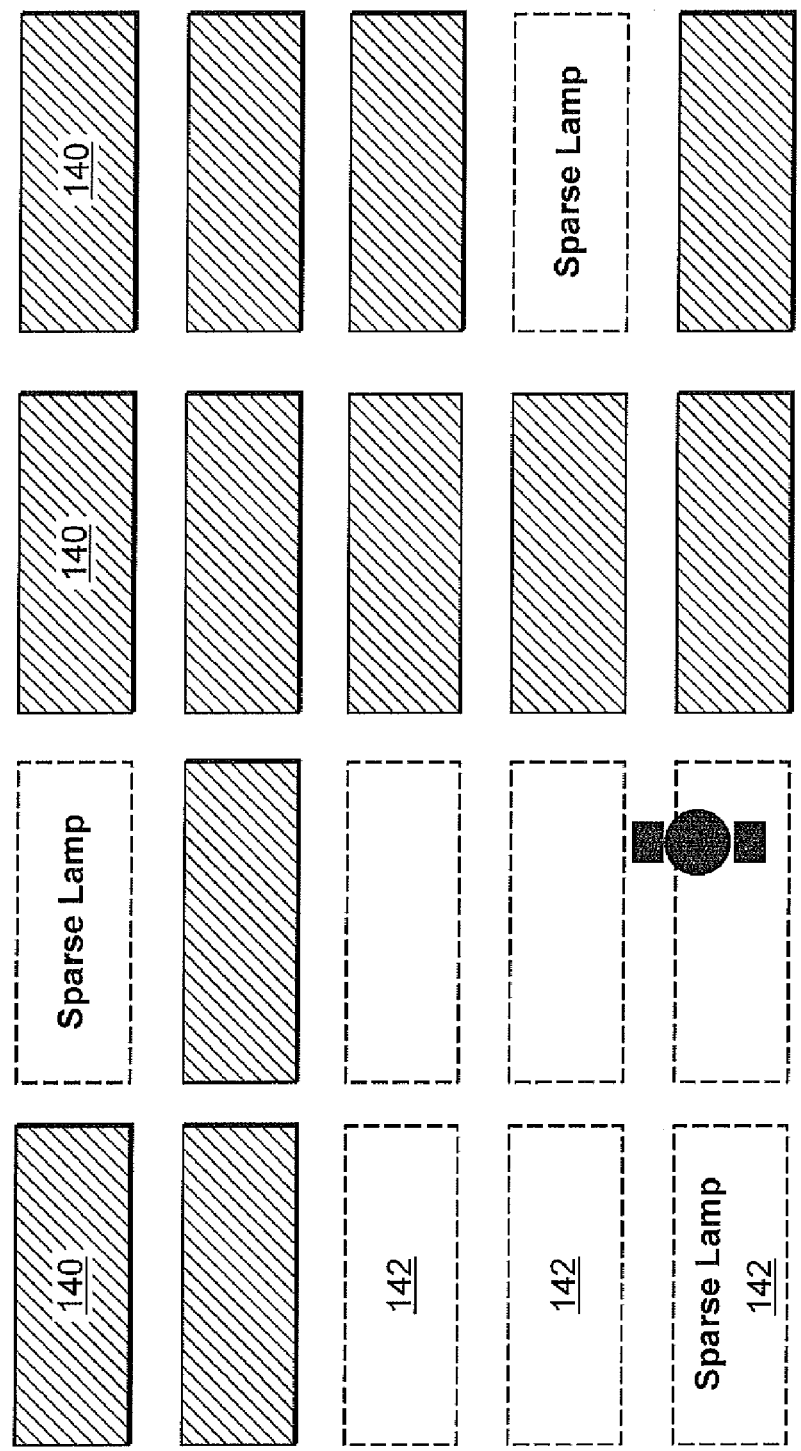
FIG. 13 is a schematic diagram illustrating an overhead view of the sparse sensing technique used in accordance with the invention.

FIG. 13 is an overhead view of the sparse sensing scheme: only some of the lights are left on for sensing. If a lamp sensor detects an occupant, it turns on the adjoining lights. Dark boxes 140 are lights that are off and unshaded boxes 142 are lights that are on. An occupant is in the detection field of one of the sparse lamps. The lamps adjoining the sparse lamp that has detected the occupant are turned on. The only other lamps that are turned on are the other sparse lamps. FIG. 14 shows an overhead view of the detection fields in the sparse sensing scheme. Because each lamp sensor has a wide angle of detection, the detection field for each sparse lamp 152 has been designed to span the space under adjoining lamps 154 as indicated.

In the sparse sensing scheme, there is no need for dimming ballasts. The lamp sensor electronics can be interfaced with standard lamp ballasts. The sparse approach only requires lamp sensors in the sparse lamps rather than all of the lamps.

Some lighting control system must be provided to sequence or control the operation of the "non-sensing" lamps in the sparse configuration. In the dimmed sensing scheme, each lamp acted independently of the other lamps. In the sparse sensing scheme, the lamps would need to be interfaced with each other. The lamp interfacing could be achieved with lighting control technologies such as General Electric's Total Lighting Controls® (TLC) or the Digital Addressable Lighting Interfaces® (DALI). For autonomous operation, the non-proximity sensing lamps in the sparse configuration could detect a signal from the sparse lamp, e.g., an imperceptible optical flicker or other "triggering" signal such as an RF message.

The lamp sensor shows potential as a built-in occupancy sensor for fine-grain lighting control. Three lamp sensor parameters affect the detection sensitivity. Electrode depth and spacing have been studied and their effects on the detection sensitivity were presented. The effect of bulb power on signal source amplitude and noise content can be quantified to the user's preference and varying bulb power on the detection sensitivity. These results will be important for the dimmed sensing technique.

Two sensing techniques for reduced lighting energy consumption have been presented, but other are possible. Both techniques use lamp sensors for fine-grain occupancy detection. One uses dimming lamp ballasts and operates the lamp sensors under dimmed conditions. The other uses sparsely populated lamp sensors and takes advantage of the wide angle of detection of the lamp sensors to detect nearby occupants. Other techniques are also possible given reliable proximity detection.

The lamp sensor electronics have been designed so that they do not contribute significantly to the noise floor of the lamp sensor system. The dominant noise source is the signal source itself, i.e., the bulbs and ballast. This noise source limits the robustness and resolution of the lamp sensor. Therefore, differential-mode feedforward compensation is pursued to actively cancel the signal source noise. The implementation of feedforward compensation in the modulation technique would require a division to eliminate intensity noise since it appears as random modulations of the carrier signal. Low-noise, high-frequency analog division may be achieved with current-mode translinear circuits.

Although the present invention has been shown and described with respect to several preferred embodiments thereof, various changes, omissions and additions to the form and detail thereof, may be made therein, without departing from the spirit and scope of the invention.

What is claimed is:
1. A fluorescent lamp sensor system comprising:
a plurality of bulbs;
a plurality of electrodes electromagnetically coupled to said bulbs;
a balanced differential circuit for measuring changes in electric fields produced by said bulbs in front of said electrodes, said balanced differential circuit includes a symmetric current source associated with alternating the surface potential of said bulbs;

a current mode detection circuit for detecting the current associated with the capacitive effects of the balanced differential circuit; and a synchronous detection circuit for isolating the capacitive effects of the symmetrical current source from stray signals that differ in either frequency or phase.

2. The fluorescent lamp sensor system of claim 1, wherein said balanced differential circuit comprises a capacitive bridge circuit.

3. The fluorescent lamp sensor system of claim 1, wherein said balanced differential circuit comprises a capacitive bridge circuit.

4. The fluorescent lamp sensor system of claim 1, wherein said symmetric current source is symmetrically centered about said fluorescent lamp sensor system by reversing the ballast connection to one of said bulbs.

5. The fluorescent lamp sensor system of claim 1, wherein said current mode detection circuit comprises a fully differential front-end amplifier.

6. The fluorescent lamp sensor system of claim 5, wherein said electrodes are directly coupled to said differential front-end amplifier.

7. A method of implementing a fluorescent lamp sensor system comprising:

providing a plurality of bulbs;

providing a plurality of electrodes electromagnetically coupled to said bulbs;

providing a balanced differential circuit for measuring changes in electric fields produced by said bulbs in front of said electrodes, said balanced differential circuit includes a symmetric current source associated with alternating the surface potential of said bulbs;

providing a current mode detection circuit for detecting the current associated with the capacitive effects of the balanced differential circuit; and providing a synchronous detection circuit for isolating the capacitive effects of the symmetrical current source from stray signals that differ in either frequency or phase.

8. The method of claim 7, wherein said balanced differential circuit comprises a capacitive bridge circuit.

9. The method of claim 7, wherein said balanced differential circuit comprises a capacitive bridge circuit.

10. The method of claim 7, wherein said symmetric current source is symmetrically centered about said fluorescent lamp sensor system by reversing a ballast connection to one of said bulbs.

11. The method of claim 7, wherein said current mode detection circuit comprises a fully differential front-end amplifier.

12. The method of claim 11, wherein said electrodes are directly connected to said differential front-end amplifier.

13. A method of performing the operations of a fluorescent lamp sensor system comprising:

providing a plurality of bulbs;

providing a plurality of electrodes electromagnetically coupled to said bulbs;

measuring changes in electric fields produced by said bulbs in front of said electrodes using a symmetric current source associated with alternating the surface potential of said bulbs;

detecting the current associated with the capacitive effects of the balanced differential circuit; and isolating the capacitive effects of the symmetrical current source from stray signals that differ in either frequency or phase.

14. The method of claim 13, wherein said symmetric current source is symmetrically centered about said fluorescent lamp sensor system by reversing the ballast connection to one of said bulbs.

15. The method of claim 13, wherein said electrodes are directly connected to a fully differential front-end amplifier.

16. A lighting system comprising:

a plurality of fluorescent lamp structures being positioned to provide lighting in an enclosed space; and a plurality of detection structures comprising a selective number of said fluorescent lamp structures to detect whether an occupant is within said enclosed space, each of he detection structures comprising:

a balanced differential circuit for measuring changes in electric fields produced by said occupant, said balanced differential circuit includes a symmetric current source associated with alternating the surface potential of bulbs associated with each of said detection structures;

a current mode detection circuit for detecting the current associated with the capacitive effects of the balanced differential circuit; and a synchronous detection circuit for isolating the capacitive effects of the symmetrical current source from stray signals that differ in either frequency or phase; wherein the intensity of the fluorescent lamp structures are increased from its initial point of intensity when an occupant has been detected by said detection structures.

17. The lighting system of claim 16, wherein the initial point of intensity of the fluorescent lamp structures is set at dim.

18. The lighting system of claim 16, wherein a selective number of said fluorescent lamp structures are turned off and a selective number of said detection structures are turned on.

* * * * *

UNITED STATES PATENT AND TRADEMARK OFFICE
CERTIFICATE OF CORRECTION

| | | |
|---|---|---|
| PATENT NO. | : 7,923,936 B2 | Page 1 of 1 |
| APPLICATION NO. | : 12/139678 | |
| DATED | : April 12, 2011 | |
| INVENTOR(S) | : Cooley et al. | |

It is certified that error appears in the above-identified patent and that said Letters Patent is hereby corrected as shown below:

IN THE TITLE

Please replace the following in the title of U.S. Patent No. 7,923,936:

FLUORESCENT LAMP WITH INTEGRAL PROXIMITY SENSOR FOR BUILDING ENERGY MANAGEMENT

Signed and Sealed this
Twenty-fourth Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,923,936 B2 | Page 1 of 1 |
| APPLICATION NO. | : 12/139678 | |
| DATED | : April 12, 2011 | |
| INVENTOR(S) | : Cooley et al. | |

It is certified that error appears in the above-identified patent and that said Letters Patent is hereby corrected as shown below:

Title Page, Item (54) and at Column 1, lines 1-3, Title should read

-- FLUORESCENT LAMP WITH INTEGRAL PROXIMITY SENSOR FOR BUILDING ENERGY MANAGEMENT --

This certificate supersedes the Certificate of Correction issued May 24, 2011.

Signed and Sealed this
Twenty-first Day of June, 2011

David J. Kappos
*Director of the United States Patent and Trademark Office*